United States Patent [19]
Wibrow

[11] 3,894,466
[45] July 15, 1975

[54] COATED FASTENING ELEMENT

[75] Inventor: Gunter Wibrow, Norderstedt, Germany

[73] Assignee: Illinois Tool Works Inc., Chicago, Ill.

[22] Filed: July 8, 1974

[21] Appl. No.: 486,534

[30] Foreign Application Priority Data
July 10, 1973  Germany............................ 2335023

[52] U.S. Cl.................... 85/10 F; 24/73 PM; 85/72; 117/138.8 B; 117/62
[51] Int. Cl.²...................... F16B 13/10; F16B 15/04
[58] Field of Search.......... 85/72, 80, 84, 10 F, 1 C, 85/1 JP, 5 R; 24/73 PM, 73 PF, 73 P; 117/138.8 B, 138.8 N, 138.8 R, 168

[56] References Cited
UNITED STATES PATENTS

| | | | |
|---|---|---|---|
| 2,402,287 | 6/1946 | Kearns | 85/72 |
| 2,542,144 | 2/1951 | Kearns | 85/72 |
| 2,724,303 | 11/1955 | Holcomb | 85/10 F |
| 3,385,157 | 5/1968 | Rapata | 85/72 |
| 3,429,937 | 2/1969 | Blackley | 117/138.8 B X |
| 3,799,584 | 3/1974 | Slocum | 85/1 JP X |

*Primary Examiner*—Ramon S. Britts
*Attorney, Agent, or Firm*—Robert W. Beart; J. R. Halvorsen

[57] ABSTRACT

A thermoplastic fastening element formed of hygroscopic materials having a predetermined modulus of elasticity and a separate moisture barrier coating provided over the entire outer surface of the fastening element providing a moisture-proof seal.

10 Claims, 3 Drawing Figures

COATED FASTENING ELEMENT

The invention relates to a fastening element for connecting at least two workpieces and/or retaining members at carrier workpieces or the like which are adapted to be inserted in holes in a self-retaining manner.

Such fastening elements are inserted for example in the outer skin of automotive vehicles, in order to retain ornamental trim moldings or other members. They are also inserted in the interior of an automotive vehicle, for instance in order to retain the inner lining. There are, however, numerous further cases of application for such fastening elements which are not to be dealt with in detail.

The fastening elements which are often formed as thermoplastic injection-molded parts are designed in such a manner that they are adapted to be inserted in mounting holes in snapping engagement where they are self-retaining and where they may be loosened again only if a predetermined force of withdrawal is applied.

In many cases of application, now, it is desired that the fastening elements water-tightly close the mounting holes. With the fastening elements nowadays in use this effect cannot always be obtained in a sufficient degree even though they may be formed as thermoplastic injection-molded parts. It is therefore the object of the invention to provide a fastening element by means of which a mounting hole may be effectively closed against the ingress of water.

With fastening elements of the type mentioned at the beginning, this problem is solved in that the fastening elements are at least in part provided with a coating forming a barrier against water and vapour.

The coating forming a barrier against water and vapour is arranged at least in that portion of the fastening element which is situated inside the mounting and fastening hole. The coating forming a barrier against water and vapour lies close against the wall of the hole and thus prevents water of vapour from passing between the wall of the hole and the fastening element.

The fastening elements normally consist of a head lying close against one side of the workpiece and a shank seated in the mounting hole. If, now, the coating forming a barrier against water and vapour possesses a certain plastic shapability, upon insertion of the fastening element in a fastening hole, a portion of the coating may flow from the gap between the wall of the hole and the wall of the shank into the region between the head underside and the side of the workpiece facing it, in order to form here a corresponding sealing. In this manner, it is possible to replace separate sealing rings and sealing bushings which have been employed so far when water-tightness was required. As will doubtless be seen, the provision of separate sealing rings or bushings for fastening elements which must in addition be pre-assembled thereon or are inserted in the fastening holes prior to the actual mounting step, is relatively costly from both a material and a mounting point of view, because this requires an additional operational step. It is, however, also known in connection with thermoplastic injection-molded parts to obtain water-tightness by an elastic sealing disc integrally injection-molded with said parts or by the spreading of a closed spreading member. In the case of major thermal loads, for example, when using fastening elements for automotive vehicles which are in need of re-lacquering and are subjected to high temperatures in a so-called re-lacquering furnace or also as a result of cold flow the fastening element loses its bias and becomes untight because the area pressure or the contact pressure on the underlayer is no longer sufficient. These disadvantages cannot occur with the fastening element according to the invention if the coating has imparted thereto a certain temperature resistance.

In one embodiment of the invention provision is made for the fastening elements to be completely provided with a coating forming a barrier against water and vapour. With the aid of this measure according to the invention a further and very essential advantage is obtained which relates especially to fastening elements out of hygroscopic synthetic materials, particularly polyamides. Such synthetic materials suffer from the disadvantage that their modulus of elasticity is strongly dependent on the content of water. That means that the forces of impression and extension change with the relative humidity of the air. After the injection molding process the fastening elements are completely dry but with thin wall gauges will rapidly absorb humidity from the environments if there is an occasion to do so. If such fastening elements were employed in a completely dry condition, the danger would exist that due to their brittleness they could be inserted only with difficulty and would easily tend to break or tear. If they absorb plenty of moisture after mounting, the danger exists that the great reduction of the modulus of elasticity resulting therefrom may lead to extremely low forces of extension and the fastening elements will thus be unable to guarantee the safe functioning thereof as a fastening means in a sufficient degree. It is therefore usual to condition fastening elements out of hygroscopic synthetic material after injection-molding, that means to provide them with a predetermined moisture content. The fastening elements are then stored in watertight and vapour-tight containers or bags until they are used in order not to change the predetermined degree of moisture. True, it is obtained hereby that there is a predetermined force of impression available for the installation of the fastening elements. After installation, however, the moisture content of the fastening elements will adapt itself to the respectively prevailing humidity of the air.

For the above described reasons, fastening elements out of hygroscopic synthetic materials are relatively rarely employed although the cost of material is relatively low as compared with other thermoplastic synthetic materials. With the aid of the coating forming a barrier against water and vapour in accordance with the invention it is possible to condition fastening elements in the manner as desired. The coating forms a barrier against water and vapour at the outer skin of the fastening element and prevents moisture from entering into or leaving the fastening element, thus preventing in particular thin-walled elements from drying-out very quickly or absorbing too much water owing to a very high relative humidity of the air.

In one embodiment of the invention provision is made in this connection for the coating to consist of a hydrocarbon of higher valence, preferably of a mixture of hydrocarbons of higher valences. With the aid of such a synthetic wax it is possible to condition the fastening elements in a simple manner within a very narrow range of tolerances. Owing to its relatively low adhesion a portion of the synthetic wax is forced into the region between the head and the workpiece surface facing it when the fastening element is forced into a fastening hole and fulfils here the function of a sealing ring, in order to close the fastening in a watertight manner.

In a further development of the above provision is made for the composition of the hydrocarbon mixture to be selected such that the point of solidification, the melting point and the drip point are lying closely together. It may be obtained by suitable modification of the hydrocarbon mixture that a property providing a watertight effect is guaranteed even with high temperatures. As already described above, such a high temperature may occur when the fastening elements are employed in automotive vehicles and the latter are charged into a so-called re-lacquering furnace for re-lacquering during their fabrication. The temperatures occurring in this operation are, if possible, not to impair the water-tightness of the coating.

The above described fastening elements are in many cases of application fastened on a carrier workpiece and are serving in their turn to fasten other articles or to bear on these articles such as, for example, to hold ornamental trim or moldings to the outer skin of automotive vehicles or to hold the lining in the interior of an automotive vehicle. It has become known to provide suitable end pieces or borderings for fastening elements to hold ornamental trim strips which are in engagement with the interior of the trim strip. It is furthermore known to provide arresting clamps out of metal which are pushed onto the fastening elements for the ornamental trim. In such an arrangement, a high degree of stability against slippage must be guaranteed for the part to be retained, for example, the ornamental trim, because otherwise it may happen that the ornamental trim may slip on the body of the car when being treated in car-washing plants. The expenses caused in connection with ornamental trim moldings with a view to intercepting the forces of displacement are, however, relatively high. So, the ornamental trim must be provided with an additional bordering inside or separate end pieces are required which are capable of either threaded or snapping engagement and which, same as is the case with the metal clamps, necessitate an additional mounting step. In the case of the metal clamps there is the additional disadvantage that with extended use there will be corrosion phenomena showing at the ornamental trim and the body of the car.

In a further embodiment of the invention, the above mentioned disadvantages are overcome. This embodiment provides that the coating possesses a high coefficient of friction. The high coefficient of friction is so to speak effective as a slippage brake and is effective to bring about positive engagement with the part to be retained, for example, in the case of a holding arrangement for ornamental trim moldings for automotive vehicles, specific head configurations for such molding clips are known in the art and are not specifically shown. With the aid of the measure according to the invention costs in the form of mounting work and material expenses are saved because additional arresting clamps or other parts to provide an effective holding means are eliminated.

In a further embodiment of the invention provision is made in this connection for the coating to be formed by an aqueous polymer dispersion. True, such a synthetic material dispersion when conditioned does not guarantee the narrow range of tolerances of a synthetic resin because the water requires a certain time for drying which cannot be controlled so exactly that an exactly defined degree of conditioning may be obtained. However, even the slightly greater range of tolerances will suffice to effectively condition the fastening elements. After drying, the dispersion forms a coating constituting a barrier against water and vapour which adheres firmly on the outer skin of the fastening element. The high coefficient of friction of this coating material (which for example is polyolefin) produces an effective frictional engagement with the part to be retained and thus is effective as a so-called slippage brake. The film formed of a synthetic material dispersion, in addition, has a certain elasticity and thus a certain resilient capacity by which the fastening element in the hole may profit in constituting an effective holding means. In case of vibrations, shocks or other chattering effect, the film makes possible a slight axial movability of the shank of the fastening element in order to compensate for the vibrations. A coating out of a synthetic material dispersion offers furthermore the advantage of a very low degree of wear. Hereby it is prevented that in the course of time the film may become permeable to water or vapour for example at the walls of the fastening hole owing to abrasion.

Synthetic waxes or synthetic material dispersions have been mentioned above as examples of a coating forming a barrier against water and vapour. Other suitable coatings may, of course, be employed too. It may in addition be imagined that a coating of a synthetic material dispersion may be combined with a coating of a synthetic wax in such a manner, for example, that at first a fastening element is provided with a film of a synthetic material dispersion and subsequently with a film of a synthetic wax. The synthetic material dispersion takes care of a constant coating of low wear forming a barrier against water and vapour, while the coating of a synthetic wax is relied on in particular for purposes of obtaining watertightness. It is furthermore also possible to provide head and shank with different coatings in order to obtain a combination of desired properties.

The above mentioned coatings which form barriers against water and vapour may be applied by any suitable method. For a further development of the invention provision is made in this connection for the fastening elements to be immersed in a heated bath of a hydrocarbon of a higher valence, in particular, a mixture of hydrocarbons of a higher valence, and are removed from this bath with the aid of a screen after they have been heated to the temperature of the bath. In a still further development provision is made in this connection for the screen to be slightly shaken after the fastening elements have been taken out.

In another process of producing the fastening elements according to the invention provision is made for the fastening elements to be immersed in a bath of an aqueous polymer dispersion, and placed on a shaking screen for dripping and subjected to a stream of hot air.

In the following, the advantages to be obtained with the fastening elements according to the invention are once more summarized. The coating forming a barrier against water and vapour watertightly seals bores in carrier work-pieces, such as for instance the body of a car, over a wide range of temperatures. In the case of hygroscopic synthetic materials the coating which forms a barrier against water and vapour prevents an uncontrolled change of the modulus of elasticity of the synthetic material due to the absorption or liberation of water. This layer forming a barrier against water and vapour saves additional sealing rings. With a coating forming a barrier against water and vapour and having a high coefficient of friction there are no additional arresting clamps or similar parts necessary.

In the following, an example of embodiment of the invention is described by way of a drawing.

In the drawing,

FIG. 2 is a sectional view of the spreading rivet in a fastening hole with spreading mandrel driven in;

Figure 1:
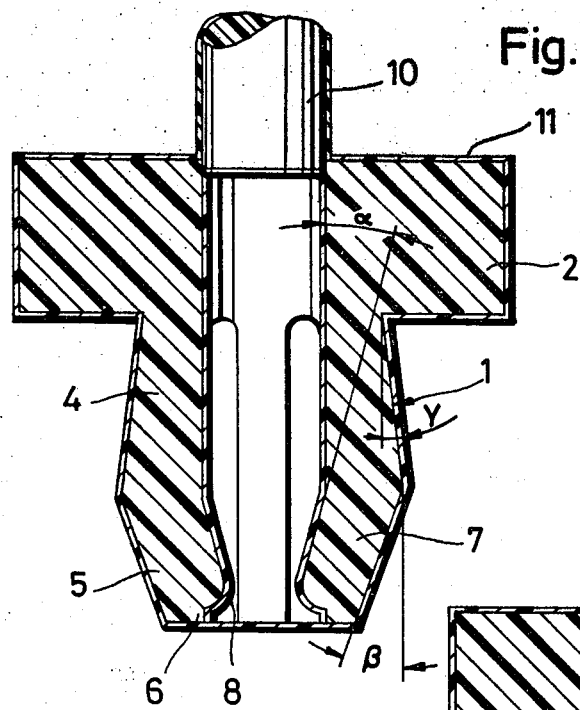
FIG. 1 is a sectional view of a spreading rivet.

The spreading rivet 1 shown in the drawing is composed of a flange-like circular head 2 and a shank 4 joining it, said shank being provided with four axial slots. The slots 9 form four spring legs or legs 7 at first conically enlarging in contour from the head 2 and then again conically tapering toward the free end of the shank, thereby forming an approaching ramp for a spreading mandrel 10 adapted to be driven in which is integrally injection-molded with the spreading rivet 1 via a frangible membrane. The lower ends 5 of the spring legs 7 are provided with a ramp-like projection 8 terminating at the free end 6 of the shank and beginning approximately at the bend-in point between the upper and lower portions of the spring legs 4. The ramp-like projection 8 forms an acute angle $\alpha$ with the axis of the shank 4 which is smaller than the cone angle $\beta$ of the outer surface of the tapering portion 5 of the shank. The cone angle $\gamma$ of the outer surface of the enlarged portion of the shank 4 in its turn is smaller than the cone angle $\beta$.

The spreading rivet 1 is entirely provided with a coating 11 forming a barrier against water and vapour which consists, for example, of a mixture of hydrocarbons of higher valence or a synthetic material dispersion. The coating 11 forming a barrier against water and vapour is effective with respect to the material of the spreading rivet 1 which may consist, for example, of polyamide, as a barrier against water and vapour, thus preventing moisture from entering the part or leaving it. Thereby, the material of the spreading rivet retains the previously adjusted or conditioned moisture content and consequently maintains a certain modulus of elasticity. The coating 11 forming a barrier against water and vapour furthermore prevents moisture from entering into the bore 12 of the workpiece 13. The moisture which attempts to penetrate between the contacting surfaces of the head 2 and the workpiece 13 is prevented from doing so by the coating 11 or the film placed therebetween. It is furthermore prevented from penetrating into the bore 12.

Figure 2:
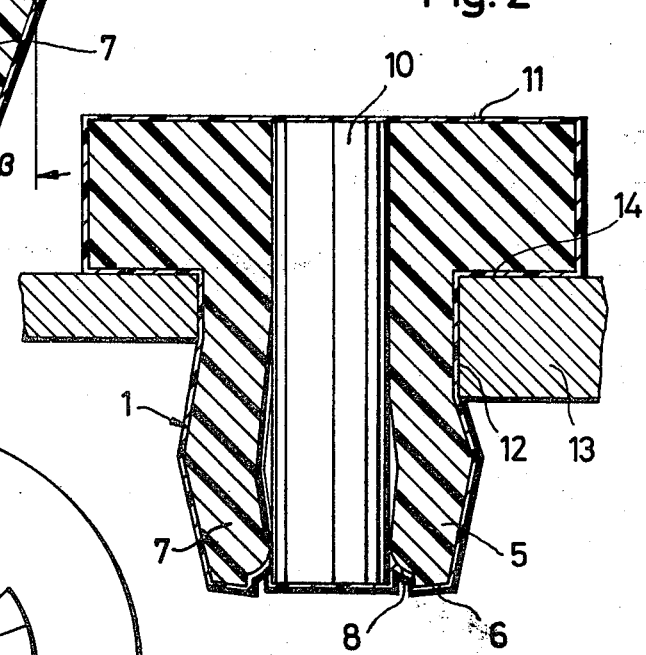
Figure 3:
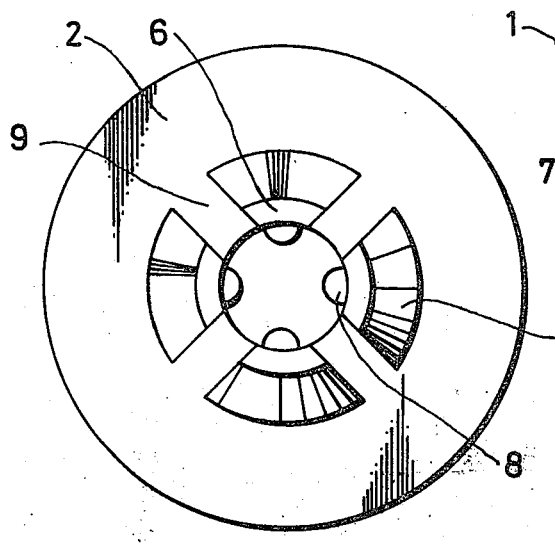
FIG. 3 is a bottom plan view of the spreading rivet as shown in FIG. 1.

In the case of a synthetic wax used for the coating 11 which is to be assumed for FIG. 2, a portion of the coating is forced along the shaft surface between the head 2 and the workpiece 13 during the insertion of the spreading rivet 1, particularly while the spreading mandrel 10 is being driven in, and forms here an accumulation 14 in the manner of a sealing ring which still improves the sealing effect.

EXAMPLE I

The parts were coated with a mixture of higher valence hydrocarbons such as commercial waxes consisting of a mixture of normal alkane, iso-alkane and cyclic alkane, with the chain lengths having from 20 to 60 carbon atoms.

EXAMPLE II

The parts were coated with a hydrocarbon mixture of the type set forth in Example I wherein the following specification is met:
Color: yellow-brown
Needle Penetration (According to Richardson at 20°C.): 20–26
Solidification point: approximately 90°–95° C.
Melting point: approximately 100°–110° C.
Drip point: approximately 100°–110° C.

EXAMPLE III

The parts were coated with a hydrocarbon mixture of the type set forth in Example II wherein the melting and drip points are adjusted to lie approximately at 140°C.

Let us assume in the case of FIG. 1 that the coating 11 is a synthetic material dispersion. With such a coating there is obtained owing to its high coefficient of friction a good retaining effect for parts to be retained by the head 2 apart from its effect of forming a barrier against water and vapour. The high coefficient of friction of the coating 11 makes possible an effective positive engagement with the part, not shown, to be retained so that the need for additional elements or parts for obtaining a retaining effect is eliminated.

EXAMPLE IV

For increased friction the parts were coated with a dispersion composed of an aqueous, 60%, coarsely dispersed, high-viscous polyisobutylene-dispersion. The film which is generated, as previously indicated, by hot air evaporation has a soft and somewhat adhesive or sticky consistency. The thickness of the film coating is relative to and controlled by the viscosity of the dispersion.

I claim:

1. Thermoplastic fastening means comprising a fastening element fabricated of hygroscopic materials which have a predetermined modulus of elasticity that has been preadjusted by controlling the moisture content of said fastening element and a separate moisture barrier coating provided over the entire outer surface of said preadjusted fastening element which is composed to provide a substantially moisture-proof seal between the fastening surfaces of said fastening element and a part to which said fastening element is secured and which remains on the other outer surfaces of said fastening element after said fastening element is secured to said part in order to maintain said predetermined modulus of elasticity at a substantially constant value, the fastening element including means thereon for securing said fastening element to the part.

2. Fastening means according to claim 1 wherein said coating consists of a mixture of higher hydrocarbons.

3. Fastening means according to claim 2, wherein the composition of said hydrocarbon mixture is selected to be such that the solidification point, the melting point, and the drip point substantially approximate each other.

4. Fastening means according to claim 2, wherein the mixture of hydrocarbons is resistant against elevated temperatures.

5. Fastening means according to claim 1, wherein said coating has a high coefficient of friction.

6. Fastening means according to claim 1, wherein said coating is formed by an aqueous polymer dispersion.

7. Fastening means according to claim 1 wherein said coating consists of a mixture of waxes from the class comprising normal alkane, iso-alkane and cyclicalkane.

8. Fastening means according to claim 7 wherein said mixture has a Richardson needle penetration factor that is in the range of 20 to 26, a solidification point of approximately 90° to 95°C, a melting point of approximately 100° to 110°C, and a drip point of approximately 100° to 110°C.

9. Fastening means according to claim 8 wherein the melting and drip points of said mixture are approximately 140°C.

10. Fastening means according to claim 7 wherein said coating comprises an aqueous, 60%, coarsely dispersed, high viscousity polyisobutylene-dispersion.

* * * * *